United States Patent
Bühle et al.

(10) Patent No.: US 10,274,029 B2
(45) Date of Patent: Apr. 30, 2019

(54) METHOD FOR OPERATING A DRIVE TRAIN OF A MOTOR VEHICLE, AND DRIVE TRAIN MODULE OF SAID MOTOR VEHICLE

(71) Applicant: ZF Friedrichshafen AG, Friedrichshafen (DE)

(72) Inventors: Felix Bühle, Eriskirch (DE); Falko Platzer, Friedrichshafen (DE); Thomas Lemp, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 89 days.

(21) Appl. No.: 15/492,602

(22) Filed: Apr. 20, 2017

(65) Prior Publication Data
US 2017/0307030 A1 Oct. 26, 2017

(30) Foreign Application Priority Data
Apr. 21, 2016 (DE) .................. 10 2016 206 744

(51) Int. Cl.
*F16D 48/08* (2006.01)
*B60K 6/48* (2007.10)
(Continued)

(52) U.S. Cl.
CPC .............. *F16D 48/08* (2013.01); *B60K 6/48* (2013.01); *B60W 20/40* (2013.01); *B60W 30/18027* (2013.01); *F16D 48/02* (2013.01); *B60K 2006/4825* (2013.01); *B60W 2510/081* (2013.01); *B60W 2510/104* (2013.01);
(Continued)

(58) Field of Classification Search
None
See application file for complete search history.

(56) References Cited

U.S. PATENT DOCUMENTS

| 7,160,225 B2 | 1/2007 | Berger et al. |
| 8,465,393 B2 | 6/2013 | Lemp et al. |
| (Continued) | | |

FOREIGN PATENT DOCUMENTS

| DE | 10316422 A1 | 12/2003 |
| DE | 102008064291 A1 | 7/2010 |
| DE | 102010061826 A1 | 5/2012 |

OTHER PUBLICATIONS

German Search Report DE102016206744.3, dated Jan. 3, 2017.(9 pages).

*Primary Examiner* — Mark A Manley
(74) *Attorney, Agent, or Firm* — Dority & Manning, P.A.

(57) ABSTRACT

A method for operating a drive train of a motor vehicle includes performing a startup operation of the motor vehicle or a stopping operation of the motor vehicle. A starting component (3) is engaged or bridged during the startup operation or the stopping operation of the motor vehicle. The startup operation is driven by a drive source (1). The method also includes comparing an actual value of an output shaft (22) based variable with a target value of the output shaft (22) based variable during the startup operation or the stopping operation and, on reaching or exceeding a specific deviation of the actual value from the target value, moving the starting component (3) into a slipping state. The starting component (3) transmits torque in the slipping state. A related drive train module for a motor vehicle is also provided.

9 Claims, 3 Drawing Sheets

(51) Int. Cl.
*B60W 30/18* (2012.01)
*B60W 20/40* (2016.01)
*F16D 48/02* (2006.01)

(52) U.S. Cl.
CPC ............... *B60W 2510/1005* (2013.01); *B60W 2710/021* (2013.01); *B60W 2710/024* (2013.01); *B60Y 2200/92* (2013.01); *F16D 2500/1045* (2013.01); *F16D 2500/10412* (2013.01); *F16D 2500/3082* (2013.01); *Y02T 10/6221* (2013.01); *Y02T 10/6252* (2013.01); *Y10S 903/946* (2013.01)

(56) References Cited

U.S. PATENT DOCUMENTS

| | | | |
|---|---|---|---|
| 8,897,944 B2 * | 11/2014 | Takamura | B60K 6/48 701/22 |
| 2006/0272869 A1 * | 12/2006 | Hidaka | B60K 6/48 180/65.25 |
| 2007/0056784 A1 * | 3/2007 | Joe | B60K 6/48 180/65.245 |
| 2007/0276557 A1 * | 11/2007 | Motosugi | B60K 6/365 701/22 |

* cited by examiner

METHOD FOR OPERATING A DRIVE TRAIN OF A MOTOR VEHICLE, AND DRIVE TRAIN MODULE OF SAID MOTOR VEHICLE

FIELD OF THE INVENTION

The invention relates generally to a method for operating a drive train of a motor vehicle as well as a drive train module of such a motor vehicle.

BACKGROUND

The drive train of a conventional motor vehicle with an internal combustion engine as the sole drive source usually has a starting component in the power flow between the drive source and the drive wheels in order to enable a startup process of the motor vehicle. Hydrodynamic torque converters or friction clutches are examples of such a starting component. The drive train of a motor vehicle with an electric motor as the sole drive source does not usually require a starting component, since the electric motor can accelerate the vehicle from a standstill.

If a startup process is to occur solely with the assistance of the internal combustion engine, the drive train of a parallel hybrid vehicle typically requires a starting component. Various alternatives for starting a motor vehicle with a parallel hybrid drive train by electrical components are known from the prior art. For example, the patent application DE 10 2006 018 058 A1 of the applicant discloses various types of startup procedures for a motor vehicle with a parallel hybrid drive train. FIG. 4 of the said prior art shows the variations over time of a purely electrically powered startup operation with a slipping converter bridging clutch; FIG. 5 shows the same with the converter bridging clutch engaged.

Both of the aforementioned startup procedures have advantages and disadvantages. A startup operation without a slipping starting component is particularly energy efficient, since none of the energy generated by the drive source is lost during the slip operation between the drive source and the drive wheels as lost power. However, at low transmission speeds, as is the case during the startup operation, a pump, which is mechanically driven by the transmission and which is provided for supplying pressure to the hydraulic consumers of the transmission, generates only a small volumetric rate of flow. This feature can restrict the functionality of the transmission and, as a result, can lead to a degradation of the driving comfort, for example, due to the slipping, gear-forming shift elements.

Even a stopping operation without a slipping starting component may be advantageous, since during a startup operation immediately following the stopping operation, the slipping starting component does not have to first be engaged or bridged again in order to enable a startup that is as energy efficient as possible.

SUMMARY OF THE INVENTION

Therefore, an exemplary task of the present invention is to provide a method, which enables an energy efficient operation of the drive train during the startup operation and at the same time ensures driving comfort.

The method is suitable for operating a motor vehicle drive train, which includes: at least one drive source, which is designed as an electric motor; a transmission for providing different gear ratios between a drive shaft and an output shaft of the transmission; as well as a starting component in the power flow between the drive source and the output shaft. In this case, the starting component can be actuated or bridged by hydraulically. The electric motor may be used either as the sole drive source in the drive train or together with an internal combustion engine in a hybrid drive train. The starting component may be arranged outside or inside the transmission. The starting component may be a dry or wet running friction clutch, which is provided separately or helps to form the gear ratios of the transmission. The starting component may also be a hydrodynamic torque converter having a hydrodynamic path that can be bridged by a bridging clutch or lock-up clutch. In this case, a startup operation of the motor vehicle that is driven by an electric motor is performed with the starting component engaged or bridged. As an alternative or in addition, this arrangement also applies for a stopping operation up to vehicle standstill.

According to example aspects of the invention, during the startup operation or the stopping operation, an actual value of a variable, which is based on or is a function of the output shaft, is compared with the target value of the variable, which is based on or is a function of the output shaft. On reaching or exceeding a specifiable deviation of the actual value from the target value, the starting component is moved out of the engaged state into a slipping state. In this slipping state, the starting component continues to transmit torque from the drive source to the output shaft. If the starting component is designed as a friction clutch, then this is achieved by reducing the pressure acting on the actuation of the starting component. If the starting component is designed as a hydrodynamic torque converter, then this is achieved by reducing the pressure acting on the bridging clutch.

By checking the plausibility of the output shaft-based variable, an error of the transmission during the startup operation or the stopping operation can be quickly detected. As a countermeasure, the starting component is moved into the slipping state so that the speed of the drive source can be increased without having to accelerate the motor vehicle. Owing to the now higher speed of the drive source, the flow rate of a hydraulic pressure supply of the transmission can be increased so that the transmission functions and, thus, the driving comfort can be guaranteed.

Preferably the output shaft-based variable is the speed ratio between the drive shaft and the output shaft, in other words, the gear ratio of the transmission. Transmissions usually already have speed sensors to detect the drive shaft speed and the output shaft speed so that the requisite variables are available without any additional effort. The speed sensor for detecting the output shaft speed does not have to measure the speed of the output shaft directly. As an alternative, it is also possible to measure the speed of a shaft that is in a constant gear ratio to the output shaft. This applies in the same way to the detection of the drive shaft speed.

According to an alternative example embodiment, the output shaft-based speed is the output shaft speed. Because the transmission speeds, which are generated during the startup operation or the stopping operation, are very small, an exact speed signal is often not available. Thus, for example, during the startup operation it is possible for a state to occur, in which the output shaft does not assume a speed despite a given drive source torque, because the oil supply to actuate or bridge the starting component is insufficient. This state can be detected by a strictly qualitative comparison of the target speed of the output shaft with the actual speed of the output shaft. For this qualitative comparison the fact that the output shaft assumes a speed is already sufficient, without having to know the speed value. If higher speeds are present, for example in excess of fifty (50) revolutions per minute, then it is also possible to perform a quantitative comparison. The speed sensor for detecting the output shaft speed does not have to measure the speed of the output shaft directly. As an alternative, it is also possible to measure the speed of a shaft that is in a constant gear ratio to the output shaft.

According to a preferred example embodiment, the output shaft-based variable may be the direction of rotation of the output shaft, whereby it is preferred that the gear stage, which is engaged in the transmission, be taken into consideration. This is significant, for example, during a startup operation on a slope, whereby, because of the slope, the vehicle accelerates counter to the desired direction of travel, if the force connection in the transmission is not or only inadequately guaranteed due to the insufficient supply of pressure. This can also lead to the transmission oil pump being driven counter to the preferred direction of rotation, as a result of which hydraulic fluid is conveyed from the controller back into the oil sump. This further degrades the pressure supply and can lead to damage or a malfunction of the pump.

If at this point a deviation of the target value from the actual value of the output shaft-based variable is detected, then the starting component is brought into slip. This bringing into slip is done preferably by increasing the drive source speed and by reducing the hydraulic pressure acting on the starting component or the bridging of said starting component. The combination of both measures speeds up the decoupling between the drive source and the output shaft and, in so doing, the provision of the transmission functions.

Preferably the reduction of the hydraulic pressure, acting on the starting component or the bridging of said starting component, is performed in a ramp-like manner, where in this case the gradient of the ramp is a function of a target drive torque of the motor vehicle. The target drive torque can be determined, for example, by the position of a gas pedal of the motor vehicle. As the target drive torque grows larger, a steeper ramp is selected, in order to carry out the decoupling in an accelerated manner.

According to a preferred example embodiment, the torque, being transmitted from the drive source to the output shaft, remains constant during the transfer of the starting component into the slip operation. This feature is achieved by suitably controlling the drive source and/or the starting component or, more specifically, the bridging of said starting component. In this way it is possible to avoid an unintentional, to the driver inexplicable, acceleration or deceleration of the motor vehicle.

In addition to the inventive method, a drive train module of a motor vehicle is also disclosed. The drive train module includes: at least one drive source, which is designed as an electric motor; an interface to an internal combustion engine of the motor vehicle; a control unit; a transmission for providing different gear ratios between a drive shaft and an output shaft of the transmission; as well as a starting component in the power flow between the drive source and the output shaft. In this case the control unit is configured for controlling or implementing the method described above.

BRIEF DESCRIPTION OF THE DRAWING

Exemplary embodiments of the invention are described in detail below with reference to the accompanying drawings. In this case identical and comparable components are provided with the same reference numerals. In the drawings.

DETAILED DESCRIPTION

Figure 1:
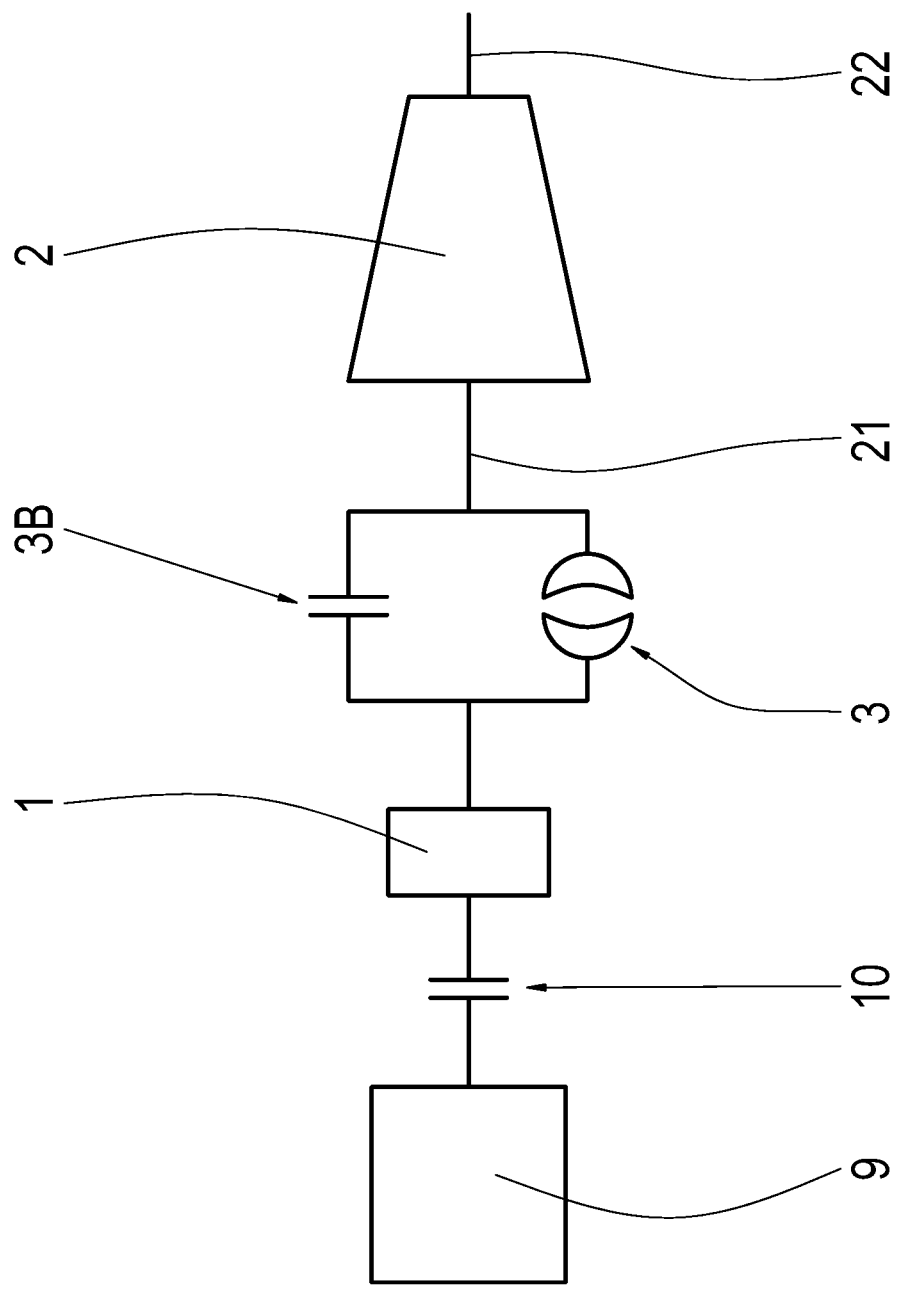
FIG. 1 shows a parallel hybrid drive train comprising a hydrodynamic torque converter as the starting component.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows in schematic form a drive train of a motor vehicle, with the drive train being designed as a parallel hybrid drive train. The drive train has an internal combustion engine 9 and a drive source 1, which is designed as an electric motor, wherein a disconnect clutch 10 is connected between the internal combustion engine 9 and the electric motor 1. Furthermore, the drive train of FIG. 1 includes a transmission 2 with a drive shaft 21 and an output shaft 22 as well as a starting component 3, with the starting component 3 being connected between the electric motor 1 and the drive shaft 21. The starting component 3 is a hydrodynamic torque converter, which can be bridged by a bridging clutch 3B that is connected in parallel. The output shaft 22 is drive-connected to the drive wheels.

If a motor vehicle, which is equipped with the drive train of FIG. 1, is to be started solely with the assistance of the electric motor 1, then such a startup can be performed with the slipping converter or with the converter that is bridged by the engaged bridging clutch 3B. In a startup operation with a slipping converter, the electric motor 1 may exhibit any speed, while the output shaft 22 stands still, for example, by actuating a foot brake of the motor vehicle. In a startup operation with the bridging clutch 3B engaged, the speeds of the electric motor 1 and the output shaft 22 are coupled by the gear ratio selected in the transmission 2.

Figure 2:
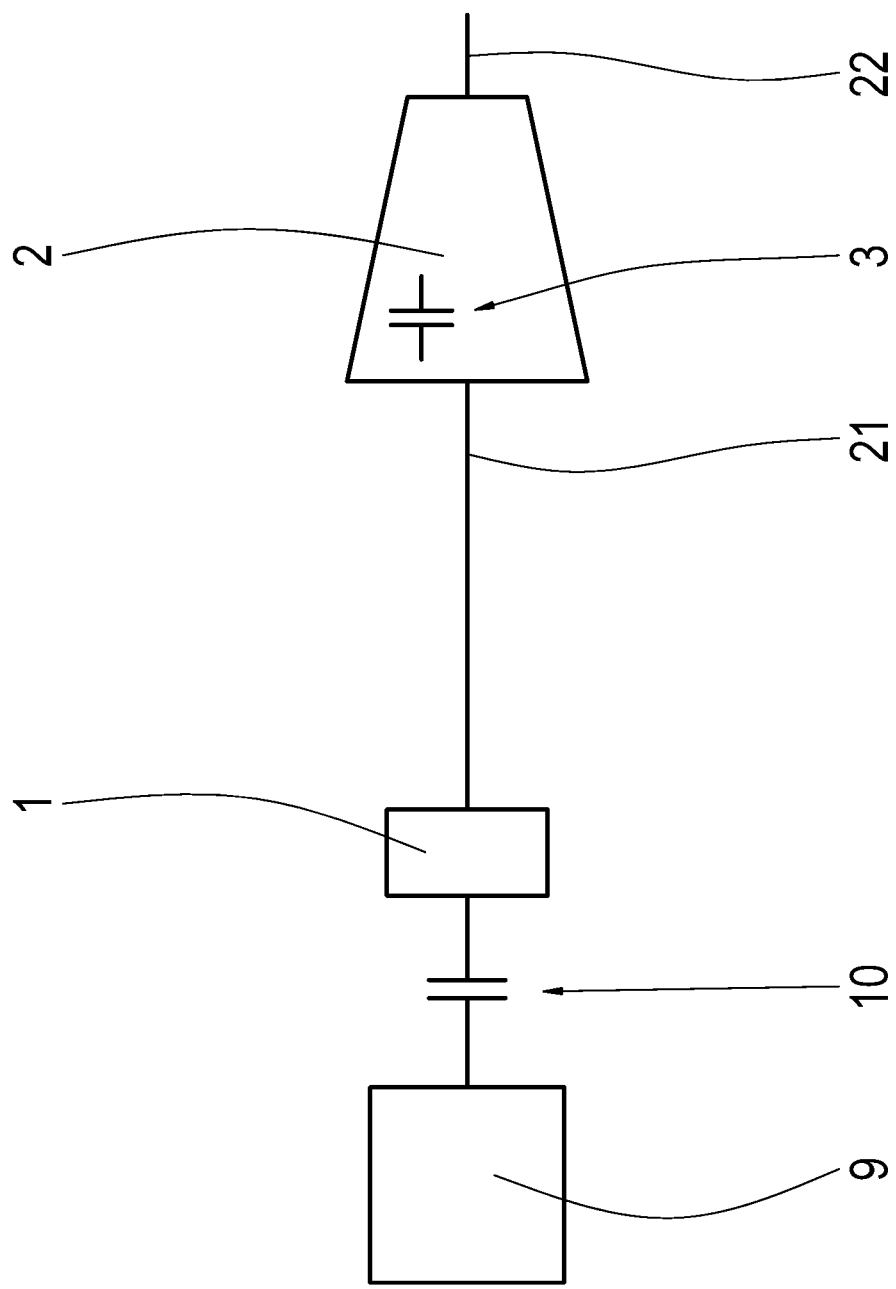
FIG. 2 shows a parallel hybrid drive train comprising a starting component that is integrated into the transmission.

FIG. 2 shows in schematic form a drive train of the motor vehicle, with the drive train being designed as a parallel hybrid drive train. In this case the starting component 3 is now integrated into the transmission 2. The starting component 3 may be, for example, one of the shift elements that helps to form the gear ratio of the transmission 2. The electric motor 1 is securely connected to the drive shaft 21. The output shaft 22 is drive-connected to the drive wheels of the motor vehicle.

If a motor vehicle, which is equipped with the drive train of FIG. 2, is to be started solely with the assistance of the electric motor 1, then such a startup can be performed with a slipping starting component 3 or with an engaged starting component 3. In a startup operation with a slipping starting component 3, the electric motor 1 may exhibit any speed, while the output shaft 22 stands still, for example, by actuating a foot brake of the motor vehicle. In a startup operation with the starting component 3 engaged, the speeds of the electric motor 1 and the output shaft 22 are coupled by the gear ratio selected in the transmission 2.

Then, when driving by purely electrical power with the drive train according to FIG. 1 or FIG. 2, the internal combustion engine 9 is usually shut down, and the disconnect clutch 10, which is connected between the internal combustion engine 9 and the electric motor 1, is completely disengaged. In contrast, in the hybrid mode, in which both the internal combustion engine 9 and the electric motor 1 are running and providing drive torque, the disconnect clutch 10, which is connected between the internal combustion engine 9 and the electric motor 1, is engaged.

The operation of the internal combustion engine 9 is controlled and/or regulated by an engine controller, and the operation of the transmission 2 is controlled and/or regulated by a transmission controller. In order to control and/or regulate the operation of the electric motor 1, there is typically a hybrid controller. The starting component 3 or, more specifically, the bridging clutch 3B is controlled and/or regulated by a starting component controller.

Typically the starting component controller and the transmission controller are implemented in a common control unit, i.e., in a transmission control unit. The hybrid controller may be a component of the transmission control unit as well. The engine controller is typically a component of a separate control unit, i.e., an engine control unit. The engine control unit and the transmission control unit exchange data with each other.

Figure 3:
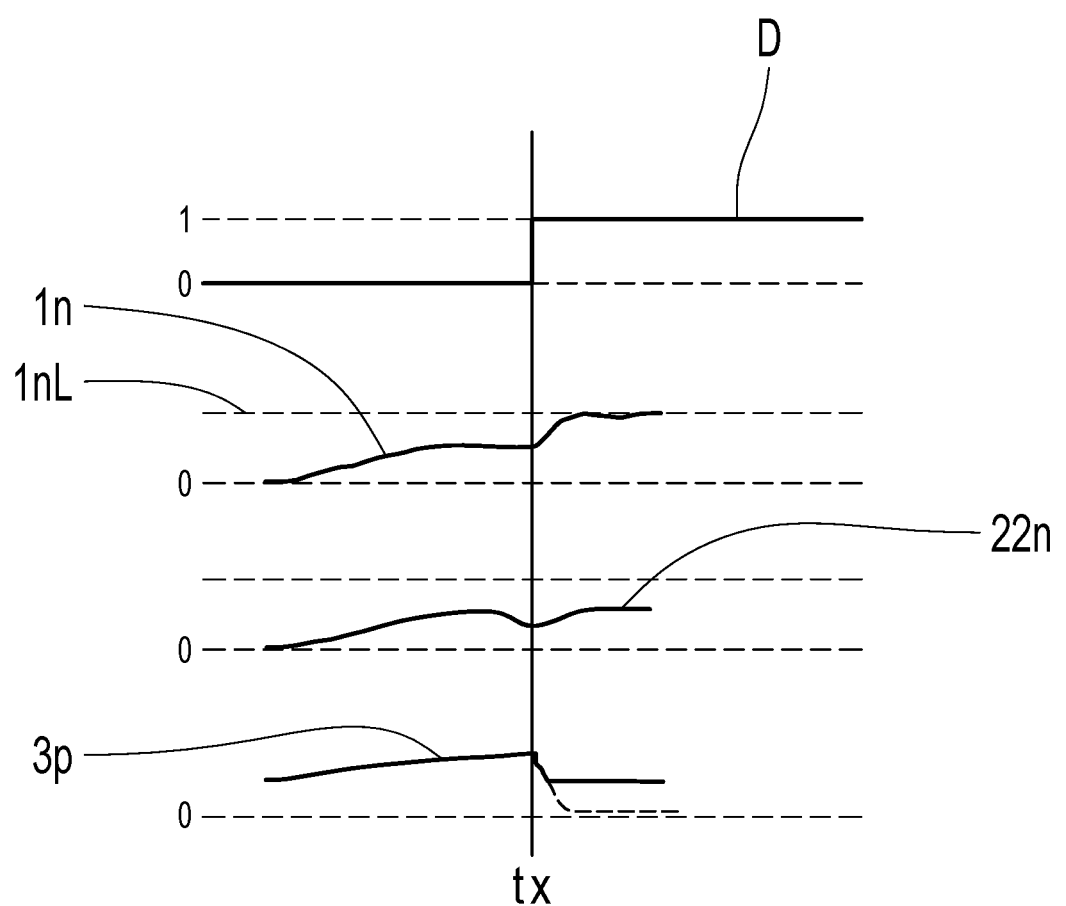
FIG. 3 shows variations over time of different variables of the drive train.

FIG. 3 shows the variations over time of different variables of the drive train during a purely electrically powered startup operation, including a diagnostic value D, a speed $1n$ of the electric motor 1, a basic speed level $1n$L of the electric motor 1, a speed $22n$ of the output shaft 22 and a hydraulic pressure $3p$, which acts on the actuation of the starting component 3 or the bridging 3B of said starting component. The electric motor speed $1n$ and the output shaft speed $22n$ increase, starting from zero, whereby the output shaft speed $22m$ initially steadily follows the electric motor speed $1n$. However, over the course of time the output shaft speed $22n$ decreases, even though the electric motor speed $1n$ remains approximately constant. At time tx the deviation of the output shaft speed $22n$ from a target value is greater than a limit value, as a result of which the diagnostic value D is increased from zero to one.

If the diagnostic value D assumes the value one, then the speed $1n$ of the electric motor 1 is increased to the basic speed level $1n$L, while the pressure $3p$ is decreased in a ramp-like manner. In the case of a drive train according to FIG. 2, the pressure $3p$ is not lowered completely, but rather reduced to a lower level, so that the starting component 3 can continue to transmit torque. The corresponding variation with time of the pressure $3p$ is shown by the solid line. In the case of a drive train according to FIG. 1, the pressure $3p$, acting on the bridging clutch 3B, is reduced completely, so that the starting component 3, which is designed as a hydrodynamic torque converter, enters the power flow between the drive source 1 and the output shaft 22. The corresponding variation with time of the pressure $3p$ is shown as a dashed line. Owing to the increase in the speed $1n$ of the electric motor 1, the oil supply to the transmission 2 is ensured, so that the output shaft rotational speed $22n$ again reaches its target value.

Modifications and variations can be made to the embodiments illustrated or described herein without departing from the scope and spirit of the invention as set forth in the appended claims.

REFERENCE NUMERALS 1 drive source
$1n$ rotational speed of the drive source
$1n$L idle speed of the drive source
2 transmission
21 drive shaft
22 output shaft
$22n$ speed of the output shaft
3 starting component
$3p$ pressure
3B bridging clutch
9 internal combustion engine
10 disconnect clutch
D diagnostic value

The invention claimed is:

1. A method for operating a drive train of a motor vehicle, the drive train comprising at least one transmission (2) for providing different gear ratios between a drive shaft (21) and an output shaft (22) of the transmission (2), a drive source (1) that is designed as an electric motor, a hydraulically actuatable or bridgeable starting component (3) in power flow between the drive source (1) and the output shaft (22), the method comprising:
performing a startup operation of the motor vehicle or a stopping operation of the motor vehicle, the starting component (3) engaged or bridged during the startup operation or the stopping operation of the motor vehicle, the startup operation driven by the drive source (1), the motor vehicle coming to a standstill during the stopping operation;
comparing an actual value of an output shaft (22) based variable with a target value of the output shaft (22) based variable during the startup operation or the stopping operation; and
on reaching or exceeding a specific deviation of the actual value from the target value, moving the starting component (3) into a slipping state, the starting component (3) transmitting torque in the slipping state.

2. The method of claim 1, wherein the output shaft (22) based variable is a current gear ratio between the drive shaft (21) and the output shaft (22).

3. The method of claim 1, wherein the output shaft (22) based variable is a speed ($22n$) of the output shaft (22).

4. The method of claim 1, wherein the output shaft (22) based variable is a direction of rotation of the output shaft (22).

5. The method of claim 4, wherein the target value of the direction of rotation of the output shaft (22) is dependent on a current gear ratio engaged in the transmission (2).

6. The method of claim 1, wherein moving the starting component (3) into the slipping state comprises increasing a speed of the drive source (1) and reducing a hydraulic pressure ($3p$) acting on the starting component (3).

7. The method of claim 6, wherein reducing the hydraulic pressure ($3p$) acting on the starting component (3) comprises reducing the hydraulic pressure ($3p$) acting on the starting component (3) in a ramped manner with a gradient of the ramp being dependent on a target drive torque of the motor vehicle.

8. The method of claim 7, wherein a torque transferred from the drive source (1) to the output shaft (22) remains constant while moving the starting component (3) into the slipping state.

9. A drive train module of a motor vehicle, comprising:
at least one drive source (1) designed as an electric motor;
an interface to an internal combustion engine (9) of the motor vehicle;
a control unit (5);

a transmission (2) for providing different gear ratios between a drive shaft (21) and an output shaft (22) of the transmission (2); and a starting component (3) in power flow between the drive source (1) and the output shaft (22), wherein the control unit (5) is programmed for implementing the method of claim 1.

\* \* \* \* \*